US006719118B1

(12) United States Patent
Eull et al.

(10) Patent No.: US 6,719,118 B1
(45) Date of Patent: Apr. 13, 2004

(54) FOLD-OVER CHUTE SAFETY DEVICE

(75) Inventors: Thomas E. Eull, Blaine, MN (US); Charles Peter Schumacher, Cedarburg, WI (US)

(73) Assignee: Schwing America, Inc., White Bear Lake, MN (US)

(*) Notice: Subject to any disclaimer, the term of this patent is extended or adjusted under 35 U.S.C. 154(b) by 5 days.

(21) Appl. No.: 10/253,978

(22) Filed: Sep. 24, 2002

(51) Int. Cl.[7] ............ B65G 11/00

(52) U.S. Cl. ............ 193/10; 193/2 R; 193/5; 193/6

(58) Field of Search ............ 193/2 R, 10, 5, 193/6

(56) References Cited

U.S. PATENT DOCUMENTS

| | | | | | |
|---|---|---|---|---|---|
| 1,946,222 | A | * | 2/1934 | Mandt | 193/10 |
| 2,488,292 | A | | 11/1949 | Hilkemeier | 193/10 |
| 3,053,367 | A | * | 9/1962 | Lynch | 193/10 |
| 3,456,769 | A | * | 7/1969 | Prichard et al. | 193/4 |
| 3,542,179 | A | | 11/1970 | Prichard | 193/5 |
| 4,498,568 | A | * | 2/1985 | Christenson | 193/10 |
| 4,919,249 | A | | 4/1990 | Alexander | 193/6 |
| 5,660,260 | A | | 8/1997 | Bareiss | 193/5 |

FOREIGN PATENT DOCUMENTS

| | | |
|---|---|---|
| GB | 731010 | 6/1955 |

OTHER PUBLICATIONS

Schwing America drawings (6 sheets) of device on sale in the U.S. prior to Aug. 24, 2001.

* cited by examiner

Primary Examiner—Richard Ridley
(74) Attorney, Agent, or Firm—Kinney & Lange, P.A.

(57) ABSTRACT

The spacing device mounted to a two-section chute system prevents inadvertent contact between the two chute sections. The spacing device includes a mounting flange and a blocking member positionable between first and second pivotally attached chute sections of a concrete mixing truck. The first chute section comprises an annular flange that is configured to contact an arcuate edge of the second chute section. The mounting flange is connected to a second end of the first chute section and the blocking member is attached to the mounting flange. The blocking member comprises a contact surface that is configured to engage a portion of the arcuate edge of the second chute section when the spacing device is in a blocking position. In the blocking position, the spacing device holds the first and second chute sections in a partially open position to prevent unintended contact between the chute sections.

32 Claims, 8 Drawing Sheets

FOLD-OVER CHUTE SAFETY DEVICE

BACKGROUND OF THE INVENTION

The present invention relates to a safety device for a foldable two-section chute system of a concrete mixing truck. In particular, the present invention relates to a blocking member positionable between adjacent ends of two chute sections when the chute system is transitioning from a folded position to an unfolded position.

Concrete mixing trucks are a common sight on the roads and at construction sites. FIG. 1 depicts a typical concrete mixing truck 10 used to transport, mix, and pour concrete. The concrete mixing truck 10 comprises a rotatable drum 12 connected to the frame of the truck 10. The rotatable drum 12 has an outlet 14 directed towards a two-section chute system 16 comprised of a first chute section 18 and a second chute section 20. The first chute section 18 has a first end 22 and a second end 24. The first end 22 of the first chute section 18 is pivotally connected to the concrete mixing truck 10. The second end 24 of the first chute section 18 is connected to a hydraulic cylinder 26 that is attached to the frame of the truck 10. The second chute section 20 has a first end 28 opposing the second end 24 of the first chute section 18. The first chute section 18 and the second chute section 20 are attached by a pivotal connection 30 located at top edges 32, 34 of chute sections 18, 20, respectively, adjacent to the second end 24 of the first chute section 18 and the first end 28 of the second chute section 20.

The two chute sections 18, 20 are traditionally capable of being in either a folded position or an unfolded position. During transport, the chute sections 18, 20 are placed in the folded position with the second chute section 20 resting on top of the first chute section 18 as shown in FIG. 1. When the concrete is ready for pouring, the second chute section 20 is rotated about the pivotal connection 30 until the second end 24 of the first chute section 18 and the first end 28 of the second chute section 20 make contact. The hydraulic cylinder 26 aligns the unfolded two-section chute system 16 with the desired location for pouring concrete. Concrete in the rotatable drum 12 is moved through the outlet 14 onto the chute system 16.

One of the problems related to the two-section chute system of concrete mixing trucks occurs when the second chute section is in the process of unfolding. To move from the folded position to the unfolded position, the second chute section is initially manually rotated to an angle sufficient to allow the second chute section to continue rotating by gravity into the final unfolded position. The two-section chute system is in the final unfolded position when the opposing end of the second chute section abuts the opposing end of the first chute section and the second chute section is forced to stop its rotation. The weight of the second chute section, combined with the momentum of the second chute section from the gravitational rotation, can cause injury to a person working alongside a concrete mixing truck in the event the person has a body part located between the opposing edges of the two chute sections. If a person is unaware that the second chute section is being unfolded, the person may not be able to remove the body part from the contact area of the two chute sections in time to avoid injury. It is thus desirable to improve the safety of two-section chute systems.

BRIEF SUMMARY OF THE INVENTION

The spacing device of the present invention prevents unintended contact between two pivotally attached chute sections of a concrete mixing truck, where the first chute section comprises an annular flange adjacent to a second end of the first chute section and the second chute section comprises an arcuate edge configured to contact the annular flange of the first chute section. The spacing device comprises a mounting flange connected adjacent to the second end of the first chute section and a blocking member connected to the mounting flange. The blocking member comprises a contact surface that is spaced from the annular flange and positioned to contact a portion of the arcuate edge of the second chute section when the blocking member is in a blocking position.

While the above-identified drawing figures set forth preferred embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention. It should be specifically noted that the figures have not been drawn to scale, as it has been necessary to enlarge certain portions for clarity.

DETAILED DESCRIPTION

Figure 1:
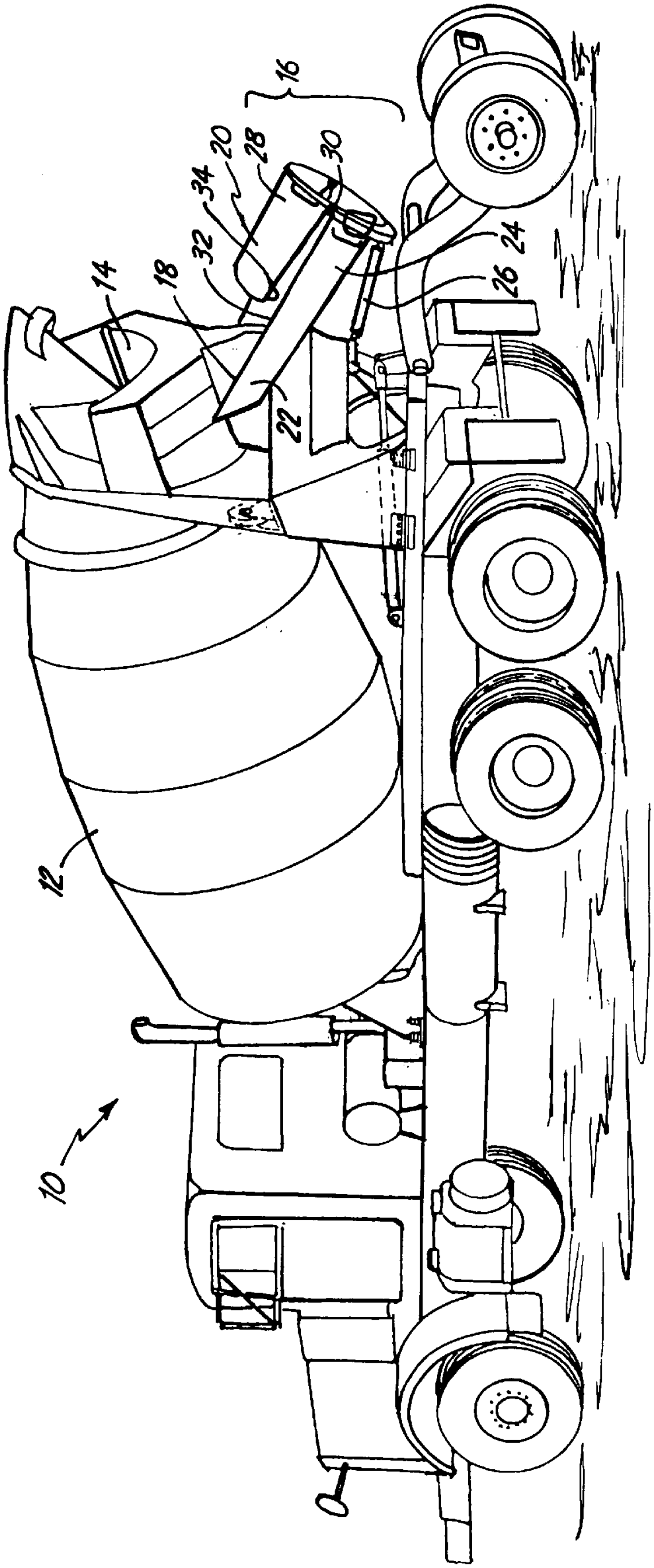
FIG. 1 is a perspective view of a concrete mixing truck with a two-section chute system known in the art.
Figure 2:
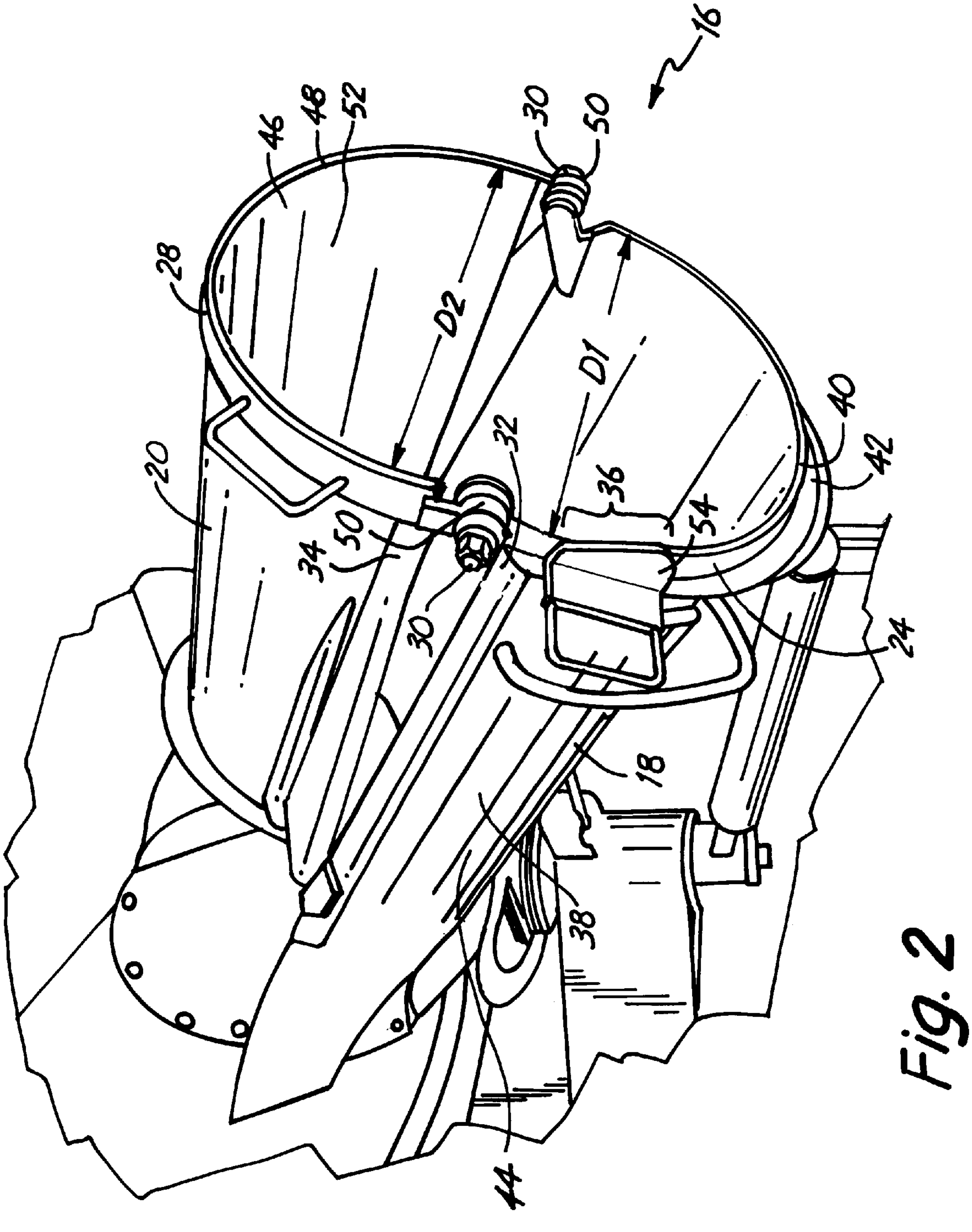
FIG. 2 is a perspective view of a two-section chute system in a folded position showing the spacing device of the present invention.

To better illustrate the spacing device 36 of the present invention, FIG. 2 is an enlarged perspective view of the two-section chute system 16 shown in FIG. 1. The first chute section 18 is comprised of an elongated arcuate wall 38 that terminates in an arcuate edge 40 at second end 24. The arcuate wall 38 of the first chute section 18 has a diameter D1 at the second end 24 adjacent to the pivotal connection 30. An annular flange 42 is connected to an outer surface 44 of the arcuate wall 38 adjacent to the arcuate edge 40 of the first chute section 18. The second chute section 20 is comprised of an elongated arcuate wall 46 that terminates in an annular, arcuate edge 48 at the first end 28. The arcuate wall 46 of the second chute section 20 has a diameter D2 at the first end 28 adjacent to the pivotal connection 30. The diameter D2 of the second chute section 20 is slightly greater than the diameter D1 of the first chute section 18.

The pivotal connection 30 is formed by a hinge 50 that connects the top edge 32 of the first chute section 18 to the top edge 34 of the second chute section 20 near the arcuate edges 40, 48. In the transition from the folded position to the unfolded position, the second chute section 20 is rotated about the hinge 50. Because the diameter D2 of the arcuate wall 46 of the second chute section 20 is greater than the diameter D1 of the arcuate wall 38 of the first chute section 18, an inner surface portion 52 of the second chute section 20 overlaps the outer surface portion 44 of the first chute section 18 when the chute sections 18, 20 are in a fully unfolded position. In the unfolded position, arcuate edge 48 of the second chute section 20 engages annular flange 42 of the first chute section 18.

To prevent the arcuate edge 48 of the second chute section 20 from uncontrollably coming into contact with the annular flange 42 of the first chute section 18 during the unfolding process, a spacing device 36 is connected to the chute system 16. In one embodiment, the spacing device 36 is mounted to the annular flange 42 of the first chute section 18 near the hinge 50. The spacing device 36 is comprised of a blocking member 54 with a contact surface 56 that is spaced rearwardly from the annular flange 42 of the first chute section 18. The contact surface 56 of the blocking member 54 is positioned to make contact with a portion of the arcuate edge 48 of the second chute section 20 when the spacing device 36 is in a blocking position. The chute sections 18, 20, hinge 50, and spacing device 36 each are formed from a heavy metal material.

Figure 3:
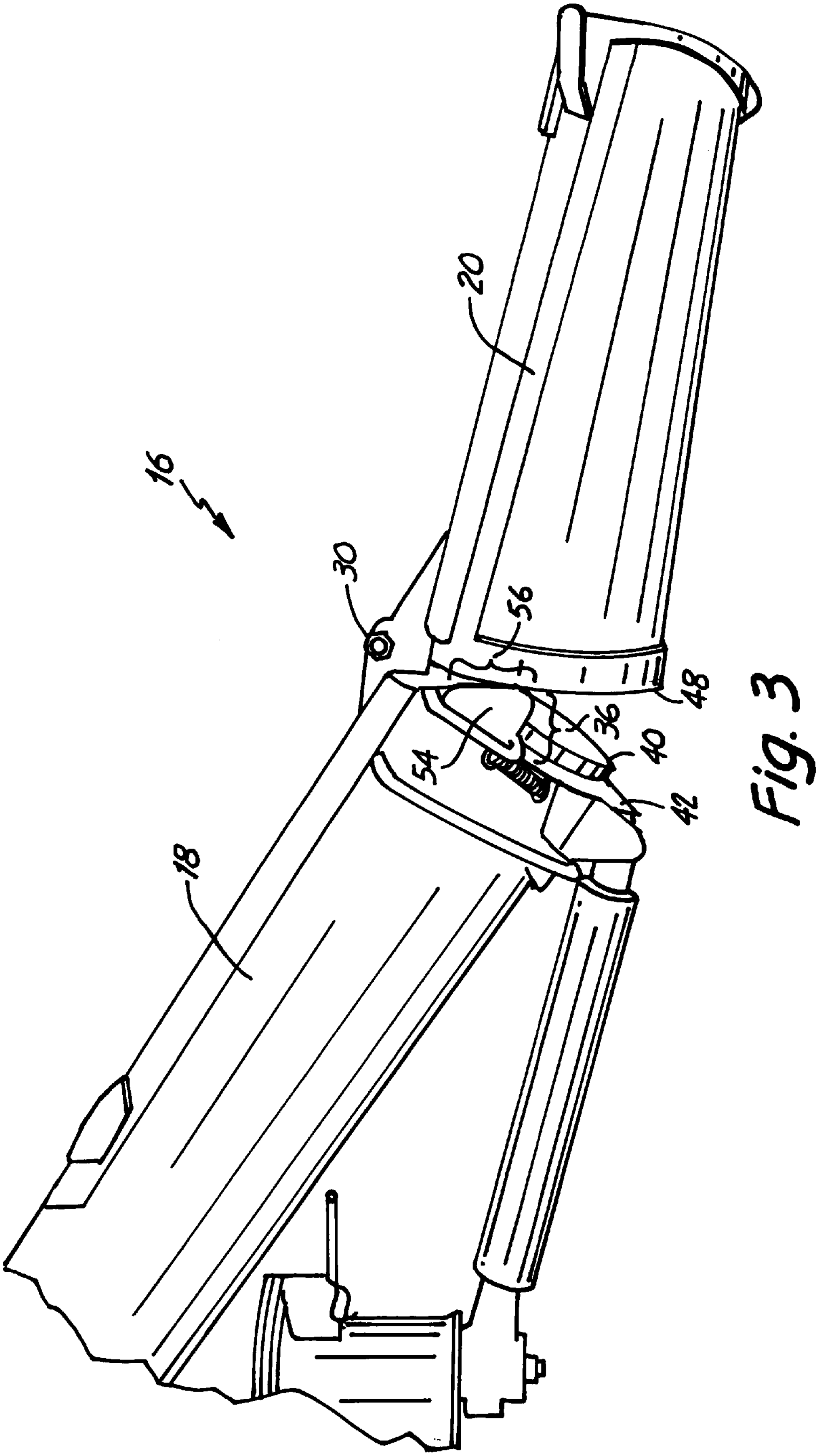
FIG. 3 is a side view of a two-section chute system in a partially open position showing the spacing device of the present invention.
Figure 4:
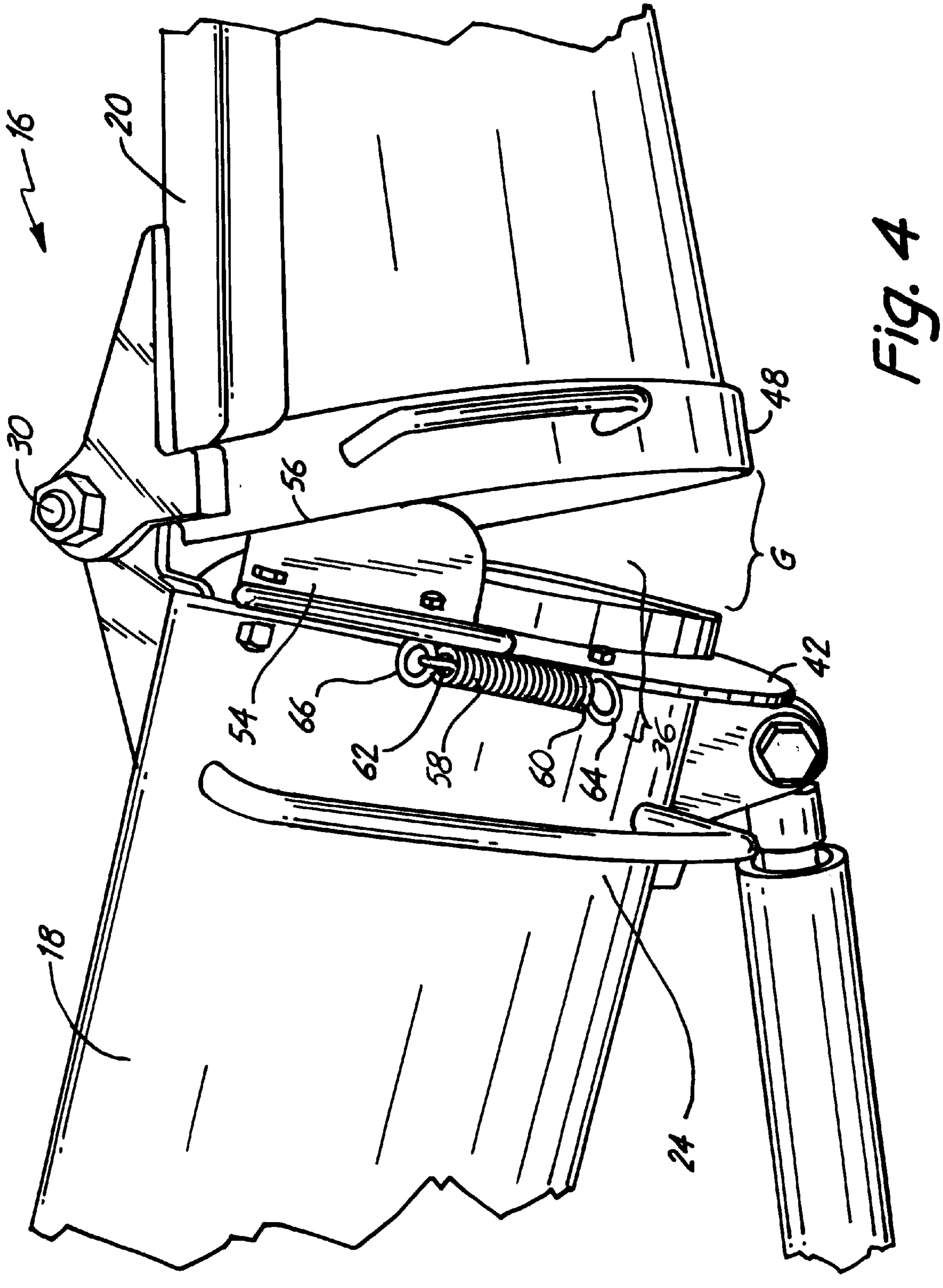
FIG. 4 is an enlarged side view of a two-section chute system showing the spacing device of the present invention.

FIGS. 3 and 4 are side views of the spacing device 36 in the blocking position. As shown in FIG. 3, spacing device 36 is located on first chute section 18 so as to prevent second chute section 20 from fully unfolding. Thus, spacing device 36 engages arcuate edge 48 of second chute section 20 at a point spaced from annular flange 42. As shown in greater detail in FIG. 4, the spacing device 36 is positioned between the annular flange 42 of the first chute section 18 and the arcuate edge 48 of the second chute section 20. As the second chute section 20 unfolds about the hinge 50, the contact surface 56 of blocking member 54 is axially aligned with a portion of the arcuate edge 48 of the second chute section 20, preventing engagement between the arcuate edge 48 of the second chute section 20 and the annular flange 42 of the first chute section 18. The angle formed by the spacing device 36 while in the blocking position is a function of the angle of the contact surface 56 and is selected to create a gap G of sufficient size to prevent harmful contact of second chute section 20 against a person's extremities.

Spacing device 36 is urged towards the blocking position by a biasing means, which in one embodiment comprises an elongated coil spring 58. Other biasing structures can be used without departing from the intended scope of the invention, as will be evident to those skilled in the art. The elongated coil spring 58 has a first end 60 and a second end 62. The first end 60 of the coil spring 58 is connected to the second end 24 of the first chute section 18. The second end 62 of the coil spring 58 is connected to the blocking member 54. By way of a non-limiting example, the first and second ends 60, 62 of the coil spring 58 are connected to the second end 24 of the first chute section 18 and the blocking member 54, respectively, by eye-bolts 64, 66.

Figure 5:
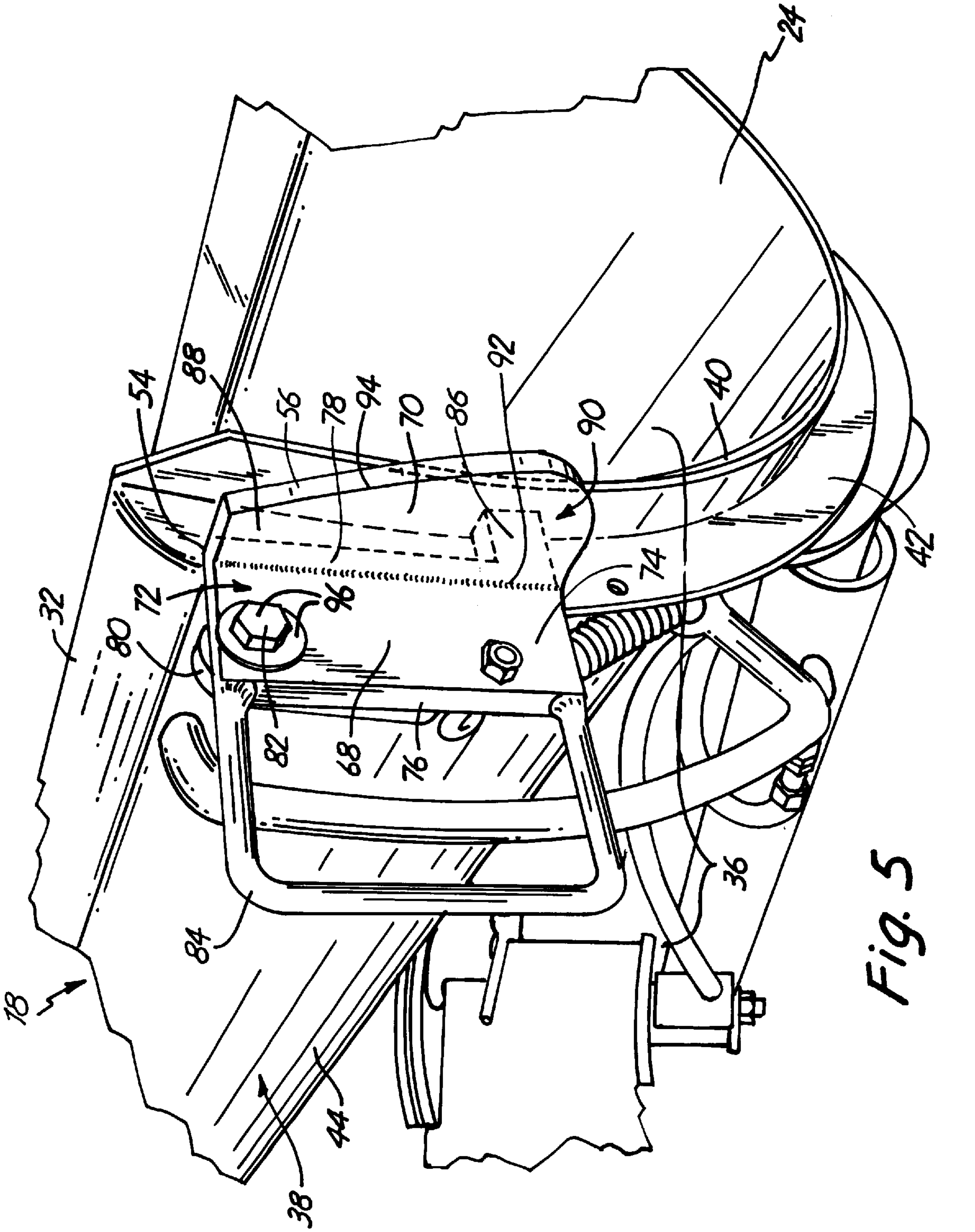
FIG. 5 is an enlarged perspective view of an end portion of a first chute section with the spacing device of the present invention in a blocking position.

FIG. 5 is an enlarged perspective view of a portion of the second end 24 of the first chute section 18 with blocking member 54 in the blocking position. In one preferred embodiment, the blocking member 54 comprises first and second plates 68, 70. The first plate 68 has a first end 72 and a second end 74, and a first edge 76 and a second edge 78. The first plate 68 is pivotally attached to a mounting flange 80 by a pivotal connection 82. A handle 84 is connected to the first edge 76 of the first plate 68. The handle 84 extends in the same plane as the first plate 68 and away from the arcuate wall 38 of the first chute section 18. A protrusion 86 is connected to the second edge 78 of the first plate 68 at second end 74. The protrusion 86 extends in the same plane as the first plate 68 and towards the arcuate wall 38 of the first chute section 18.

The phantom illustration of FIG. 5 shows the inner sidelong portion of blocking member 54. The protrusion 86 of the first plate 68 contacts the arcuate wall 38 of the first chute section 18 and helps align the contact surface 56 of the blocking member 54 with the arcuate edge 48 of the second chute section 20 when the spacing device 36 is in the blocking position. When in the blocking position, protrusion 86 is positioned to engage the outer surface 44 of the arcuate wall 38 of the first chute section 18, adjacent to the annular flange 42. Although FIG. 5 depicts the protrusion 86 at the second end 74 of the second edge 78 of the first plate 68, the protrusion 86 can be located at other areas along the second edge 78 of the first plate 68 without departing from the intended scope of the invention, as will be evident to those skilled in the art. The length of protrusion 86 is designed to space the blocking member 54 at a distance from the arcuate wall 38 of the first chute section 18 such that the contact surface 56 of the blocking member 54 is axially aligned with the arcuate edge 48 of the second chute section 20. Thus, when the second chute section 20 is unfolding, the arcuate edge 48 of the second chute section 20 will engage the contact surface 56 of the blocking member 54, preventing unintentional abutment of the first and second chute sections 18, 20.

The second plate 70 has a first end 88 and a second end 90, and a first edge 92 and a second edge 94. The first edge 92 of the second plate 70 is connected transversely to the first plate 68, such as by welding, adjacent to the second edge 78 of the first plate 68, forming a right angle between the first plate 68 and the second plate 70. The second edge 94 of the second plate 70 comprises the angled contact surface 56 of the blocking member 54. Both first and second plates 68, 70 are formed from a metal, such as ASTM A36 plate steel having a wall thickness of about 0.375 inches. In one preferred embodiment blocking member 54 has a height of about 4.50 inches, with contact surface 56 sloping at an angle of about 20 degrees relative to first plate 68. For this preferred embodiment, the maximum width of second plate 70 relative to first plate 68 is about 2.50 inches.

The pivotal connection 82 connects the blocking member 54 to the mounting flange 80. Although FIG. 5 depicts the pivotal connection 82 of the blocking member 54 to the mounting flange 80 at the first end 72 of the first plate 68, the pivotal connection 82 can be located at other areas of the first plate 68 without departing from the intended scope of the invention, as will be evident to those skilled in the art. The pivotal connection 82 allows the blocking member 54 to shift between the blocking and non-blocking positions. By way of a non-limiting example, the pivotal connection 82 of the blocking member 54 to the mounting flange 80 is formed by a nut and bolt connection 96.

While the blocking member 54 of the present invention is comprised of first and second plates 68, 70, there are other forms that the blocking member 54 can take without departing from the intended scope of the invention, as will be evident to those skilled in the art. By way of a non-limiting example, the blocking member 54 may be comprised of a solid block of material with the pivotal connection 82 of the blocking member 54 to the mounting flange 80 located at an aperture extending through the entire length of the block. Alternatively, the blocking member 54 may be comprised of a solid block of material with the pivotal connection of the blocking member 54 to the mounting flange 80 located at a mortise section of the blocking member 54.

Figure 6:
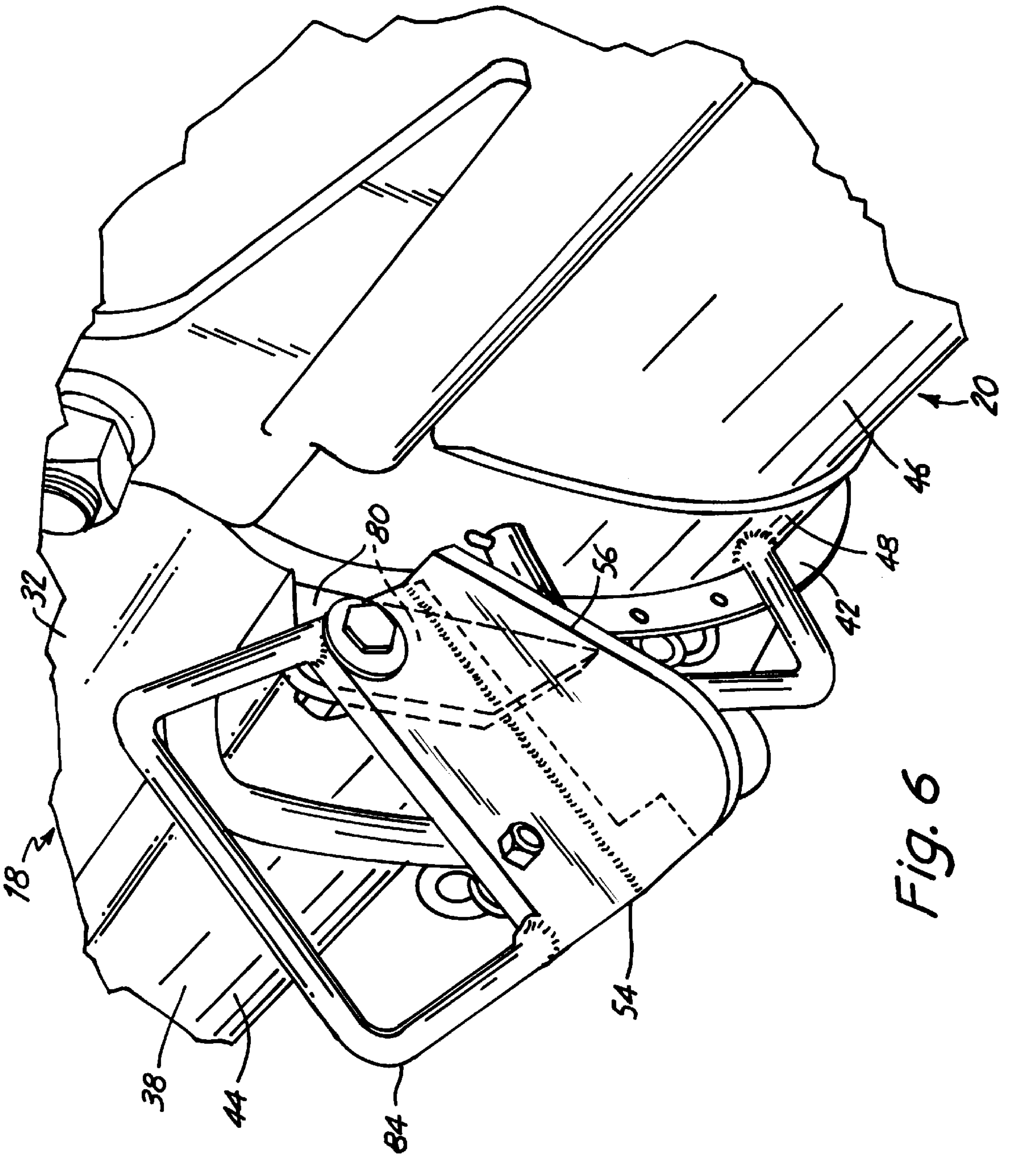
FIG. 6 is an enlarged perspective view of opposing portions of the first and second chute sections with the spacing device of the present invention in a non-blocking position.

FIG. 6 is an enlarged perspective view of blocking member 54 that has been pivoted out of the blocking position. The mounting flange 80 of spacing device 36 connects the blocking member 54 to the first chute section 18. The mounting flange 80 is connected to the first chute section 18 adjacent to the arcuate edge 40 of the first chute section 18 and near the top edge 32 of the first chute section 18. In one preferred embodiment, the mounting flange 80 is connected to the annular flange 42 of the first chute section 18 proximate to the top edge 32 of the first chute section 18. The mounting flange 80 is formed from a metal, such as plate steel, like first and second plates 68, 70.

Blocking member 54 is pivoted from the blocking position to the non-blocking position by pulling on the handle 84 to pivot blocking member 54 until the contact surface 56 no longer engages the arcuate edge 48 of the second chute section 20. As a result, the inner surface portion 52 of the arcuate wall 46 of the second chute section 20 is allowed to overlap the outer surface 44 of the arcuate wall 38 of the first chute section 18, allowing the arcuate edge 48 of the second chute section 20 to engage the annular flange 42 of the first chute section 18.

Figure 7:
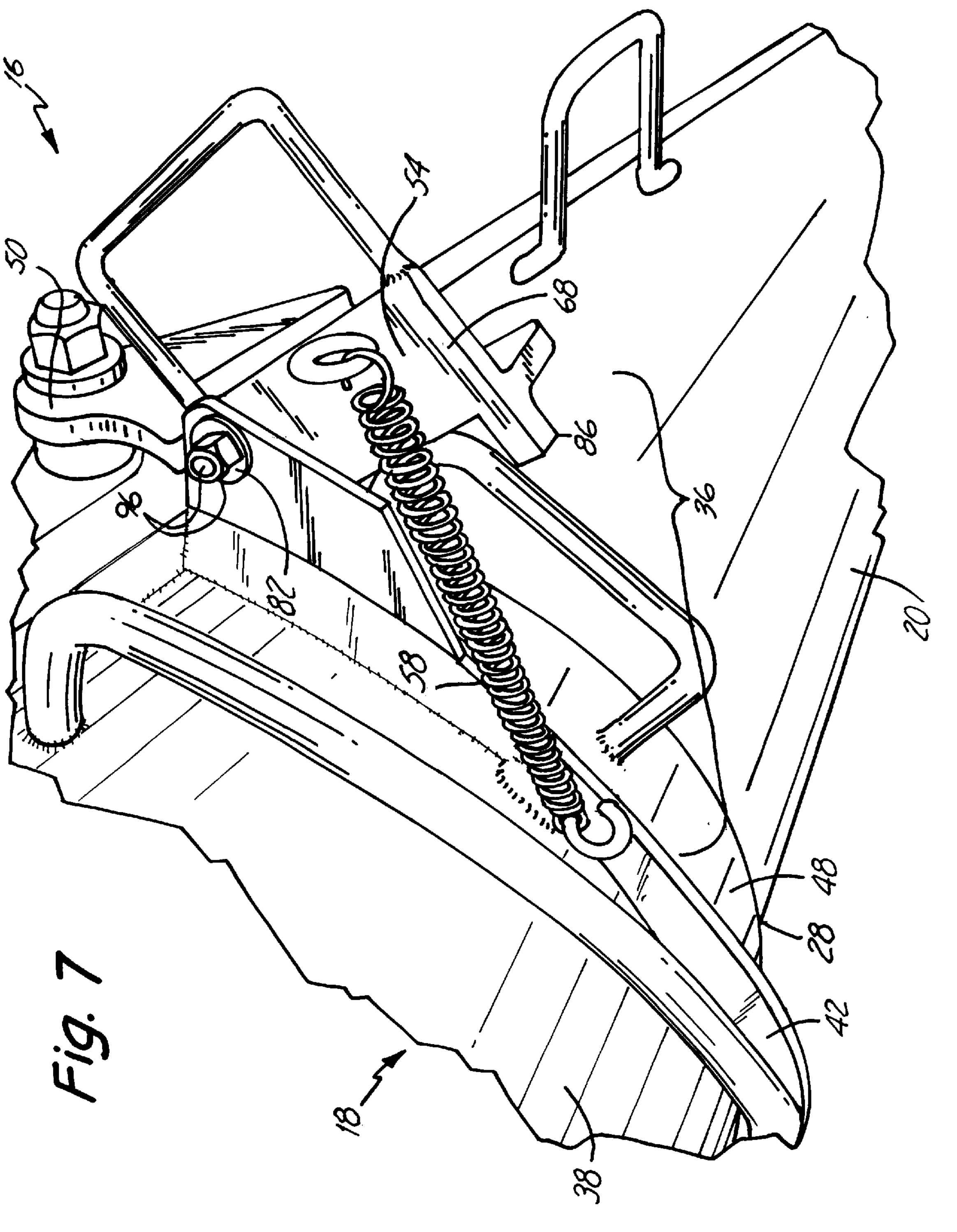
FIG. 7 is an enlarged perspective view of the front facing side of the spacing device of the present invention.

FIG. 7 is an enlarged perspective view of the front facing side of spacing device 36 in a non-blocking position. When it is confirmed that no body extremities are located between the first and second chute sections 18, 20, the blocking member 54 is pivoted away from the arcuate wall 38 of the first chute section 18 about the nut and bolt connection 96. As the blocking member 54 is pivoted away from the first chute section 18, the elongated coil spring 58 is stressed. With the spacing device 36 in the non-blocking position, the second chute section 20 completes the gravitational rotation about the hinge 50 and the arcuate edge 48 of the second chute section 20 engages the annular flange 42 of the first chute section 18. When the two-section chute system 16 is in the fully unfolded position, the protrusion 86 of the first plate 68 rests against the first end 28 of the second chute section 20. When the second chute section 20 is rotated back about hinge 50 to the folded position, blocking member 54 is urged back to the blocking position by elongated coil spring 58.

The pivotal connection 82 of the blocking member 54 to the annular flange 42 offers an easy and reliable operation of spacing device 36. In the event concrete slurry contacts the pivotal connection 82, it is still able to reliably align blocking member 54 with the arcuate edge 48 of the second chute section 20. The constant pivoting motion of the blocking member 54 between the non-blocking and blocking positions loosens and clears concrete fines or other foreign matter contacting spacing device 36. Protrusion 86 provides a visual means for confirming that blocking member 54 has been fully returned to the blocking position and that it is ready for spacing the chute sections 18, 20 in a subsequent unfolding process.

Figure 8:
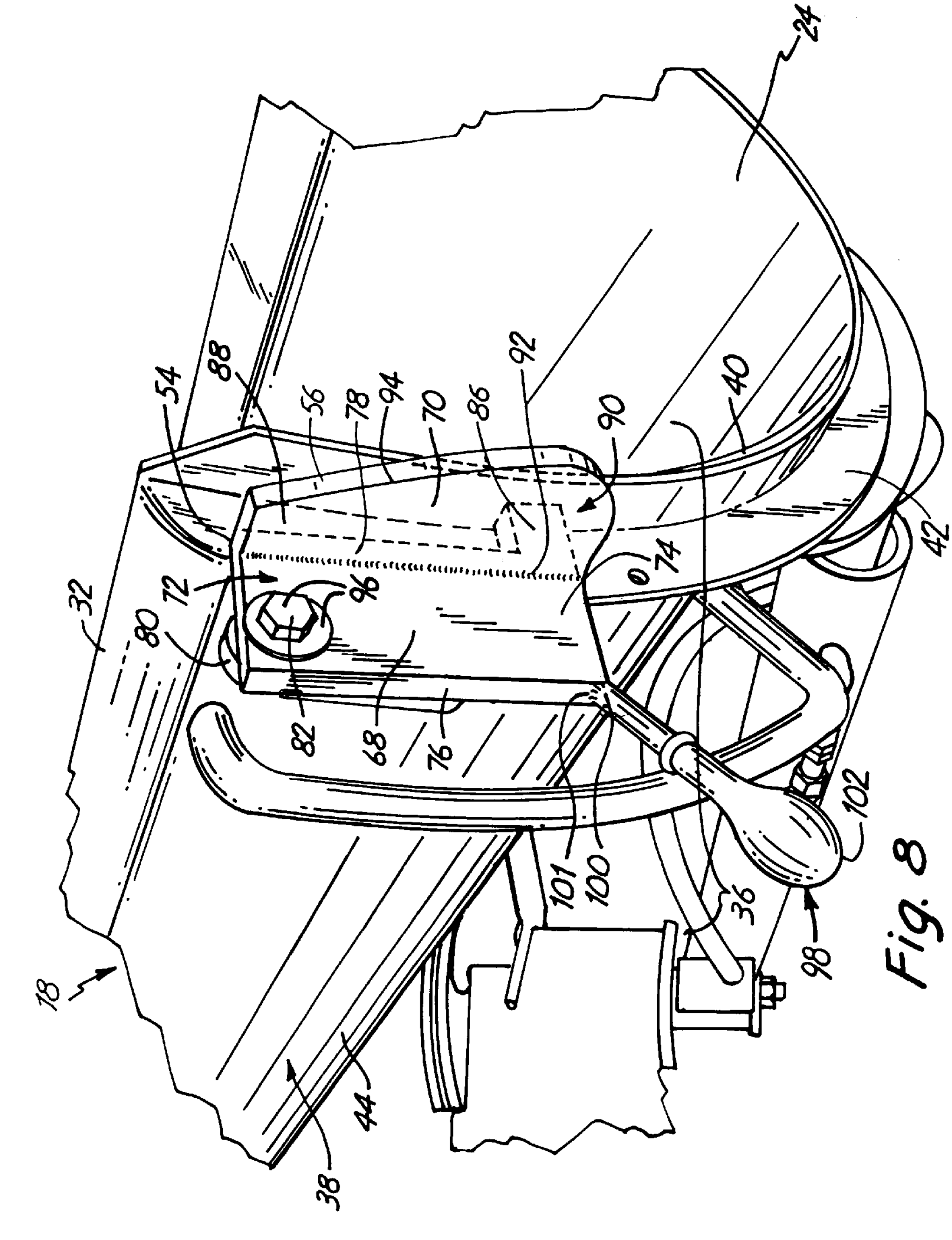
FIG. 8 is an enlarged perspective view of an end portion of the first chute section with a second embodiment of the spacing device of the present invention in a blocking position.

FIG. 8 is an enlarged perspective view of a portion of the second end 24 of the first chute section 18 with blocking member 54 in the blocking position. The first and second plates 68, 70, pivotal connection 82 and protrusion 86 of FIG. 8 are identical to the first and second plates 68, 70, pivotal connection 82 and protrusion 86 described in FIG. 5. According to the embodiment of FIG. 8, a weighted arm 98 replaces handle 84 and elongated coil spring 58 of the embodiment of FIG. 5. The weighted arm 98 has a first end 100 and a second end 102. The first end 100 of weighted arm 98 is connected to a lower corner 101 at the second end 74 of the first plate 68. The weighted arm 98 extends at a predetermined angle in the same plane as the first plate 68 and away from the arcuate wall 38 of the first chute section 18. The weighted arm 98 extends at an angle greater than 90 degrees and less than 180 degrees from the first edge 76 of the first plate. In one preferred embodiment, weighted arm extends at an angle of about 135 degrees relative to the first edge 76 of the first plate 68.

The second end 102 of weighted arm 98 is bulbous and comprises a sufficient weight to return the blocking member 54 to the blocking position by gravity. In a preferred embodiment, the weighted arm 98 is 5.00 inches in length and has a weight of about 0.90 pounds with a center of gravity about 3.50 inches from the point of attachment of the first end 100 to the blocking member 54. Arm 98 is made of a metal material.

The weighted arm 98 of blocking member 54 offers a simple and reliable means of urging the blocking member 54 to the blocking position. In the event concrete slurry contacts the spacing device 36, the weighted arm 98 is still able to reliably align blocking member 54 with the arcuate edge 48 of the second chute section 20. The weighted arm 98 relies on gravity alone to pivot the blocking member 54 about the pivotal connection 82 of the blocking member 54 to the mounting flange 80 back to the blocking position. As previously mentioned in FIG. 7, the constant pivoting motion of the blocking member 54 between the non-blocking and blocking positions loosens and clears concrete fines or other foreign matter from contacting spacing device 36. The spacing device 36 of FIG. 8 does not rely on any other movable members to return the blocking member 54 to the blocking position. After the blocking member 54 has been pivoted about pivotal connection 82, protrusion 86 provides a visual means for confirming that blocking member 54 has been fully returned to the blocking position.

A spacing device of the present invention includes a blocking member that is pivotally attached to a flange mounted adjacent to an end of a first chute section. The blocking member provides a contact surface that engages an arcuate edge of a second pivotally attached chute section when the blocking member is in a blocking position and the second chute section is being unfolded. The contact surface of the blocking member spaces the opposing ends of the chute sections at a predetermined angle, preventing unintentional or uncontrolled contact between the first and second chute sections. When it is confirmed that it is safe to allow the arcuate edge of the second chute section to fully engage the first chute section, the blocking member is pivoted from the blocking position, thereby allowing the second chute section to complete the unfolding process.

Although the present invention has been described with reference to preferred embodiments, workers skilled in the art will recognize that changes may be made in form and detail without departing from the spirit and scope of the invention.

What is claimed is:

1. A concrete chute safety system having first and second chute sections of a concrete mixing truck, wherein the first chute section comprises an annular flange adjacent to a second end of the first chute section, and the second chute section comprises an arcuate edge configured to contact the annular flange of the first chute section, the second chute section being pivotally connected to the first chute section, the safety system comprising:

a mounting flange connected to the first chute section adjacent to the second end and proximate to the pivotal connection of the first and second chute sections;

a blocking member attached to the mounting flange, the blocking member comprising a contact surface spaced from the annular flange, the contact surface being positioned to contact a portion of the arcuate edge when the blocking member is in a first position.

2. The safety system of claim 1 wherein the mounting flange is connected to the annular flange.

3. The safety system of claim 1 wherein the mounting flange is connected to the first chute section adjacent the annular flange.

4. The safety system of claim 1 wherein the mounting flange is welded to the first chute section.

5. The safety system of claim 1 wherein the blocking member is pivotally attached to the mounting flange.

6. The safety system of claim 5 and further comprising means for urging the blocking member towards the first position.

7. The safety system of claim 6 wherein the means for urging the blocking member toward the first position comprises a spring having first and second ends, the first end connected to the first chute section, the second end connected to the blocking member.

8. The safety system of claim 6 wherein the means for urging the blocking member toward the first position comprises a weighted arm extending from the blocking member.

9. The safety system of claim 1 and further comprising a means for aligning the contact surface with the portion of the arcuate edge when the blocking member is in a first position.

10. The safety system of claim 9 wherein the means for aligning the contact surface comprises a protrusion connected to the blocking member, the protrusion being positioned to contact the first chute section adjacent to the annular flange when the blocking member is in the first position and to align the contact surface with the arcuate edge of the second chute section when the blocking member is in the first position.

11. The safety system of claim 1 wherein the contact surface of the blocking member is configured to retain the second chute section relative to the first chute section by a predetermined angle when the blocking member is in the first position.

12. The safety system of claim 1 wherein the blocking member comprises:

a first plate having first and second ends and first and second edges, the first plate attached to the mounting flange adjacent to the first end of the first plate;

a second plate having first and second ends and first and second edges, the first edge of the second plate connected to the second edge of the first plate, the second plate extending generally transversely from the first plate, wherein the second edge of the second plate comprises the contact surface.

13. The safety system of claim 12 wherein the first plate is pivotally attached to the mounting flange.

14. The safety system of claim 1 and further comprising:

a handle connected to the blocking member and spaced from the contact surface.

15. A spacing device for use between first and second chute sections of a concrete mixing truck, wherein the first chute section comprises an annular flange adjacent to a second end of the first chute section, and the second chute section comprises an arcuate edge configured to contact the annular flange of the first chute section, the second chute section being pivotally connected to the first chute section, the spacing device comprising:

a mounting flange for mounting to the first chute section adjacent to the second end and proximate to the pivotal connection of the first and second chute sections;

a blocking member connected to the mounting flange, the blocking member comprising a contact surface spaced from the mounting flange, the contact surface being configured to contact a portion of the arcuate edge when the mounting flange is mounted to the first chute section, to maintain the first and second chute sections in a spaced relationship.

16. The spacing device of claim 15 wherein the blocking member is pivotally connected to the mounting flange.

17. The spacing device of claim 15 wherein the contact surface of the blocking member is configurable to retain the second chute section relative to the first chute section by a predetermined angle when the mounting flange is mounted to the first chute section and the blocking member is in a first position.

18. The spacing device of claim 15 wherein the blocking member further comprises:

a first plate having first and second ends and first and second edges, the first plate attached to the mounting flange adjacent to the first end of the first plate;

a second plate connected to the second edge of the first plate, the second plate extending transversely from the first plate, wherein the second edge of the second plate comprises the contact surface.

19. The spacing device of claim 18 wherein the first plate is pivotally attached to the mounting flange.

20. The spacing device of claim 16 and further comprising means for urging the blocking member toward a first position when the mounting flange is mounted to the first chute section.

21. The spacing device of claim 20 wherein the means for urging the blocking member toward the first position comprises a spring having first and second ends, the first end connectable to the first chute section, the second end connected to the blocking member.

22. The spacing device of claim 20 wherein the means for urging the blocking member toward the first position comprises a weighted arm extending from the blocking member.

23. The spacing device of claim 15 and further comprising:

a handle connected to the blocking member and spaced from the contact surface.

24. The spacing device of claim 15 further comprising a means for aligning the contact surface with the portion of the arcuate edge when the mounting flange is mounted to the first chute section and the blocking member is in a first position.

25. The spacing device of claim 24 wherein the means for aligning the contact surface comprises a protrusion connected to the blocking member, the protrusion being positionable to contact the first chute section adjacent to the annular flange and to align the contact surface with the arcuate edge of the second chute section when the mounting flange is mounted to the first chute section and the blocking member is in a first position.

26. A blocking device for use with a concrete chute safety system on a concrete mixing truck wherein the concrete chute includes a first chute section having a first end connected to the truck, the first chute section having an annular flange adjacent to a second end of the first chute section and having a mounting flange adjacent to the annular flange, the concrete chute further including a second chute section having an arcuate edge configured to contact the annular flange of the first chute section, the second chute section being pivotally attached to the first chute section adjacent to the arcuate edge and the second end of the first chute section, the blocking device comprising:

a blocking member, the blocking member comprising a first surface configured for connection to the mounting flange, and a second surface, spaced from the first surface, the second surface configured to contact the arcuate edge of the second chute section when the blocking member is mounted to the mounting flange.

27. The blocking device of claim 26 wherein the blocking member is pivotally mountable to the mounting flange.

28. The blocking device of claim 26 wherein the second surface of the blocking member is configured to retain the second chute section relative to the first chute section by a predetermined angle when the blocking member is mounted to the mounting flange and in a first position.

29. The blocking device of claim 26 and further comprising:

a first plate having first and second ends and first and second edges, the first plate attached to the mounting flange adjacent to the first end of the first plate, wherein the first plate comprises the first surface of the blocking device;

a second plate connected to the second edge of the first plate, the second plate extending transversely from the first plate, wherein the second edge of the second plate comprises the second surface of the blocking member.

30. The blocking device of claim 29 wherein the first plate is pivotally attachable to the mounting flange.

31. The blocking device of claim 29 and further comprising:

a handle connected to the first edge of the first plate.

32. The blocking device of claim 31 wherein the handle comprises a weighted arm.

* * * * *

UNITED STATES PATENT AND TRADEMARK OFFICE

CERTIFICATE OF CORRECTION

PATENT NO. : 6,719,118 B1

DATED : April 13, 2004

INVENTOR(S) : Thomas E. Eull et al.

It is certified that error appears in the above-identified patent and that said Letters Patent is hereby corrected as shown below:

Title page,

Item [*] Notice, delete "bydays.days.", insert -- by 5 days. --

Signed and Sealed this

First Day of March, 2005

JON W. DUDAS

*Director of the United States Patent and Trademark Office*